United States Patent [19]
Fujiwara et al.

[11] Patent Number: 5,936,384
[45] Date of Patent: Aug. 10, 1999

[54] CHARGE AND DISCHARGE PROTECTION CIRCUIT AND BATTERY PACK WITH HIGH WITHSTAND VOLTAGE

[75] Inventors: Akihiko Fujiwara, Tokyo; Toshio Ohsugi, Chiba, both of Japan

[73] Assignee: Ricoh Company, Ltd., Tokyo, Japan

[21] Appl. No.: 09/090,588

[22] Filed: Jun. 4, 1998

[30] Foreign Application Priority Data

Jun. 9, 1997 [JP] Japan ..................................... 9-151314
Jul. 30, 1997 [JP] Japan ..................................... 9-204265

[51] Int. Cl.⁶ ....................................................... H02J 7/00
[52] U.S. Cl. ........................... 320/134; 320/112; 320/164
[58] Field of Search .................................... 320/164, 128, 320/134, 107, 112, 162, 163

[56] References Cited

U.S. PATENT DOCUMENTS

| | | | |
|---|---|---|---|
| 5,493,197 | 2/1996 | Eguchi et al. ........................... | 320/134 |
| 5,581,170 | 12/1996 | Mammano et al. ..................... | 320/163 |
| 5,631,537 | 5/1997 | Armstrong .............................. | 320/164 |
| 5,705,911 | 1/1998 | Tamai ..................................... | 320/134 |
| 5,742,148 | 4/1998 | Sudo et al. .............................. | 320/134 |
| 5,783,322 | 7/1998 | Nagai et al. ............................ | 320/134 |
| 5,818,201 | 10/1998 | Stockstad et al. ...................... | 320/116 |

FOREIGN PATENT DOCUMENTS 7131938  5/1995  Japan .

Primary Examiner—Peter S. Wong
Assistant Examiner—K. Shin
Attorney, Agent, or Firm—Cooper & Dunham LLP

[57] ABSTRACT

In a charge and discharge protection circuit, those transistors constituting a level shifting circuit that may receive a relatively high voltage as a source level or a drain level have a high withstand voltage construction.

8 Claims, 5 Drawing Sheets

CHARGE AND DISCHARGE PROTECTION CIRCUIT AND BATTERY PACK WITH HIGH WITHSTAND VOLTAGE

BACKGROUND OF THE INVENTION

1. Field of the Invention

The present invention generally relates to charge and discharge protection circuits for a secondary battery and, more particularly, to a charge and discharge protection circuit for protecting a secondary battery from an overcharge state, an overdischarge state and an over-current state by detecting respective states.

2. Description of the Prior Art

FIG. 1 is a block diagram illustrating a charge and discharge protection circuit according to the related art.

For example, Japanese Laid-Open Patent Application No. 7-131938 discloses such a charge and discharge protection circuit and a battery pack using the same.

Referring to FIG. 1, the charge and discharge protection circuit according to the related art is constructed such that a voltage dividing circuit 1, an overcharge voltage detecting circuit 2, an overdischarge voltage detecting circuit 3 and a control circuit 4 are connected in parallel with a secondary battery (power supply). The control circuit 4 detects the state of the secondary battery by controlling the overcharge voltage detecting circuit 2 and the overdischarge voltage detecting circuit 3 so as to output a signal Vs for controlling the power supply to an external device or controlling charging of the secondary battery by an external power supply. The control circuit 4 further controls a switching element 5 provided in series with the voltage dividing circuit 1 so as to reduce a current flowing in the voltage dividing circuit 1.

According to the charge and discharge protection circuit of such a construction, the secondary battery is protected from an overcharge state, an overdischarge state and an over-current state by detecting respective states.

FIG. 2 is a sectional view of a transistor used to construct the charge and discharge protection circuit of FIG. 1.

The charge and discharge protection circuit according to the related art is constructed by integrating transistors having the Silicon on Insulator (SOI) construction as shown in FIG. 2.

A transistor having the SOI construction is constructed such that single-crystal silicon films 5C, 5D and 5E are formed on an insulating film 5B formed on an SOI substrate 5A. More specifically, the n-type source tare 5C and the n-type drain 5E are formed on respective sides of the channel area 5D. A gate electrode 5G is formed on the channel area 5D via a gate insulating film 5F. A protective film 5H covers the entirety of the SOI construction.

In such a charge and discharge protection circuit and a battery pack using the same, those transistors connected to terminals to which a charger is connected are required to have a high withstand voltage construction so that the secondary battery is properly protected in the event that an improper or broken charger is connected to the terminals. However, when the charge and discharge protection circuit is implemented by integrating the transistors all having the SOI construction as described above, the result is that the transistors not required to have a high withstand voltage (for example, transistors connected to the terminals connected to the battery) have a high withstand voltage. As a result, the chip area of the charge and discharge protection circuit is relatively large.

SUMMARY OF THE INVENTION

Accordingly, an object of the present invention is to provide an charge and discharge protection circuit in which the aforementioned drawbacks are eliminated.

Another and more specific object is to provide a charge and discharge protection circuit having a small circuit scale (small chip area) and a high withstand voltage, by selectively configuring transistors to have a high withstand voltage construction or a low withstand voltage construction depending on the requirements for the transistors.

The aforementioned objects can be achieved by a charge and discharge protection circuit coupled to one of a secondary battery and a charger, for protecting the secondary battery from an overcharge state, an overdischarge state and an over-current state, comprising: an overcharge detecting circuit for monitoring how the secondary battery is charged and for generating an overcharge detection signal; when level shifting circuit for receiving the overcharge detection signal from the overcharge detecting circuit and for generating a charge control signal; an overdischarge detecting circuit for monitoring how the secondary battery discharges itself and for generating an overdischarge detection signal; an over-current detecting circuit for detecting an over-current state of the secondary battery and for generating an over-current detection signal; a delay circuit for setting a delay time used when one of an overdischarge state and an over-current state is detected; a short circuit detecting circuit for detecting a short circuit state and for generating a short circuit detection signal; a plurality of protection diodes for protection of the charge and discharge protection circuit from static electricity, and wherein transistors constituting the level shifting circuit that potentially receive a relatively high voltage from the charger as one of a source level and a drain level have a high withstand voltage construction.

The aforementioned objects can also be achieved by a battery pack comprising: a battery cell; two terminals connected to one of a charger and a load; a charge and discharge protection circuit connected to said battery cell so as to protect said battery cell from an overcharge state, an overdischarge state and an over-current state; a discharge transistor connected in series between the load and said battery cell so as to control a discharge current supplied from said battery cell to the load; a charge transistor connected in series between the charger and said battery cell so as to control a charge current from the charger to said battery cell; a capacitor for setting a delay time used in detecting the overcharge state; wherein said charge and discharge protection circuit comprises: an overcharge detecting circuit for monitoring how the battery cell is charged and for generating an overcharge detection signal; a level shifting circuit for receiving the overcharge detection signal from the overcharge detecting circuit and for generating a charge control signal; an overdischarge detecting circuit for monitoring how the battery cell discharges itself and for generating an overdischarge detection signal; an over-current detecting circuit for detecting an over-current state of the battery cell and for generating an over-current detection signal; a delay circuit for setting a delay time used when one of an overdischarge state and an over-current state is detected; a short circuit detecting circuit for detecting a short circuit state and for generating a short circuit detection signal; a plurality of protection diodes for protection of the charge and discharge protection circuit from static electricity, and wherein transistors constituting the level shifting circuit that potentially receive a relatively high voltage from the charger as one of a source level and a drain level have a high withstand voltage construction.

By configuring appropriate circuit elements of the charge and discharge protection circuit to have a high withstand voltage construction, the internal circuit is prevented from being damaged even when an overcharge state is created, and the chip area of the charge and discharge protection circuit is successfully reduced.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

Figure 1:
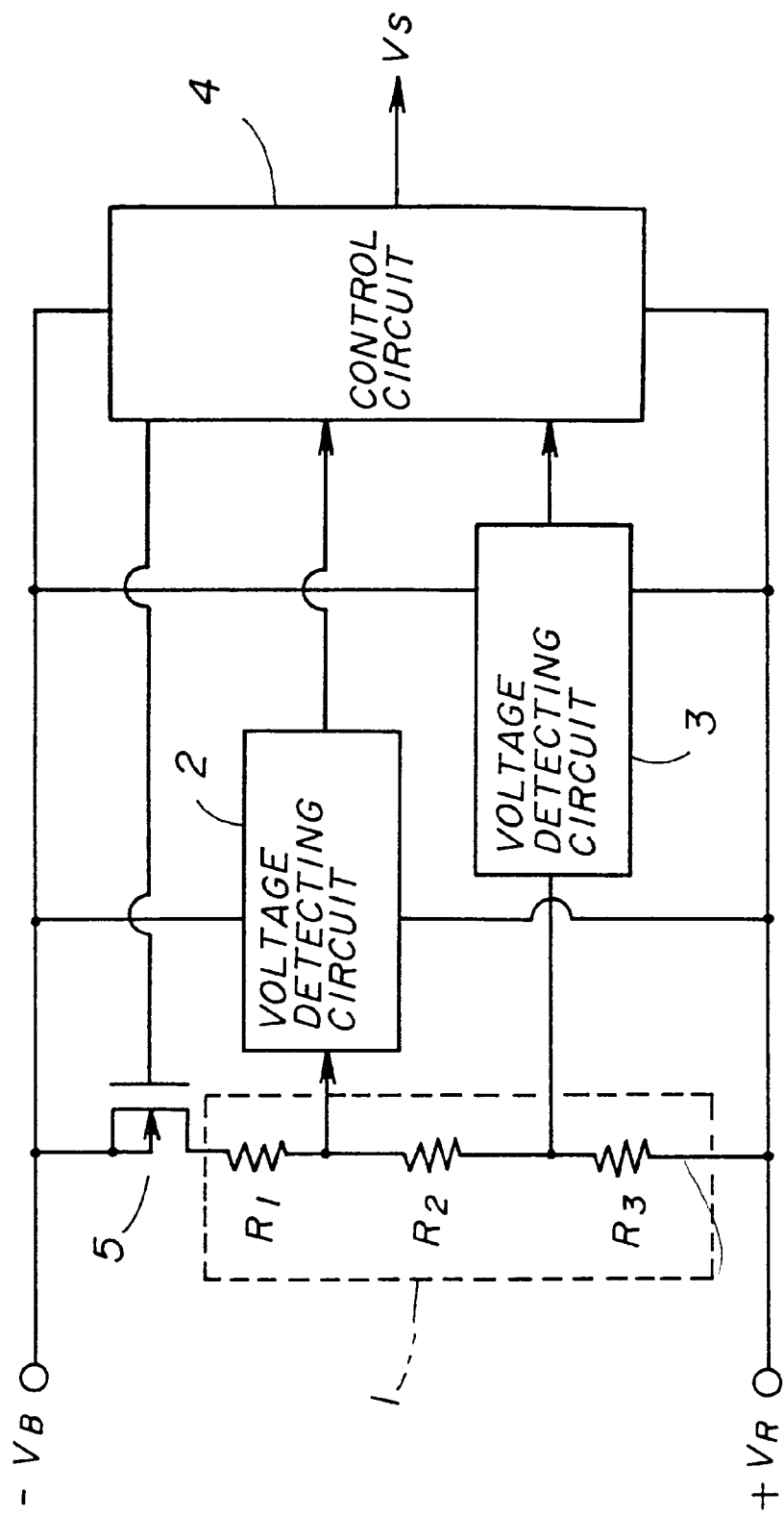
FIG. 1 is a block diagram illustrating a charge and discharge protection circuit according to the related art.
Figure 2:
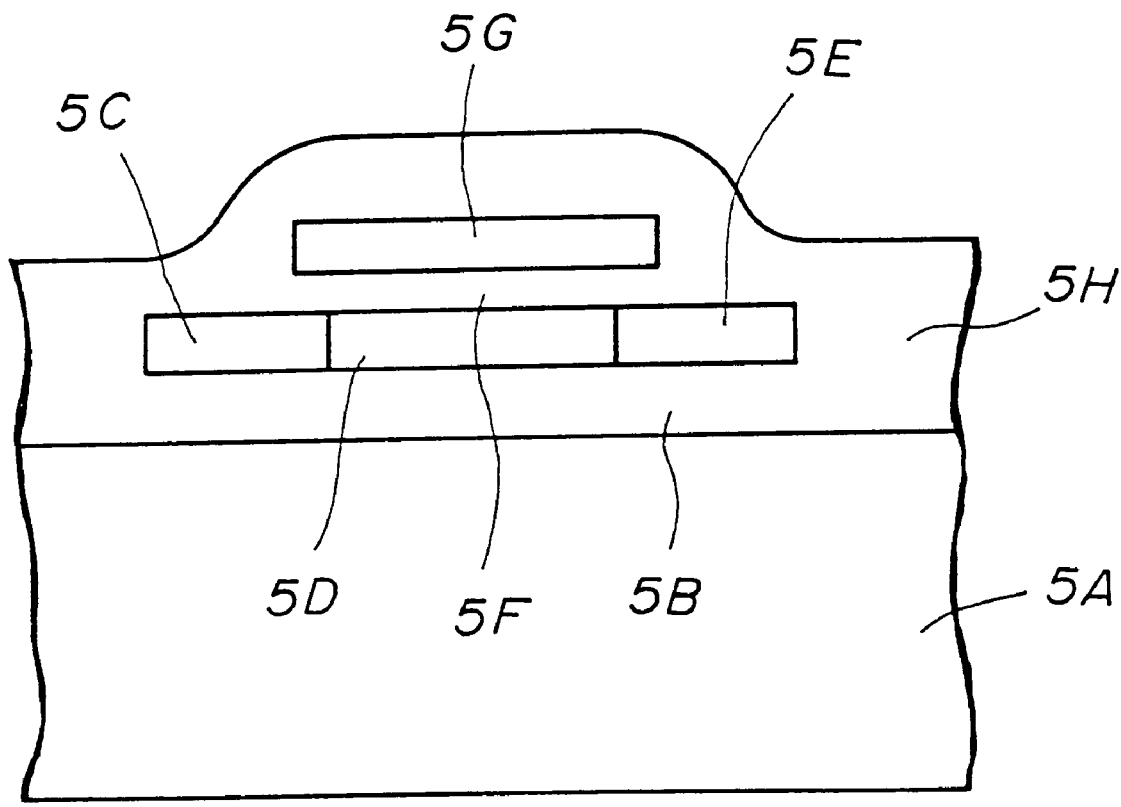
FIG. 2 is a sectional view of a transistor used to construct the charge and discharge protection circuit of FIG. 1.
Figure 3:
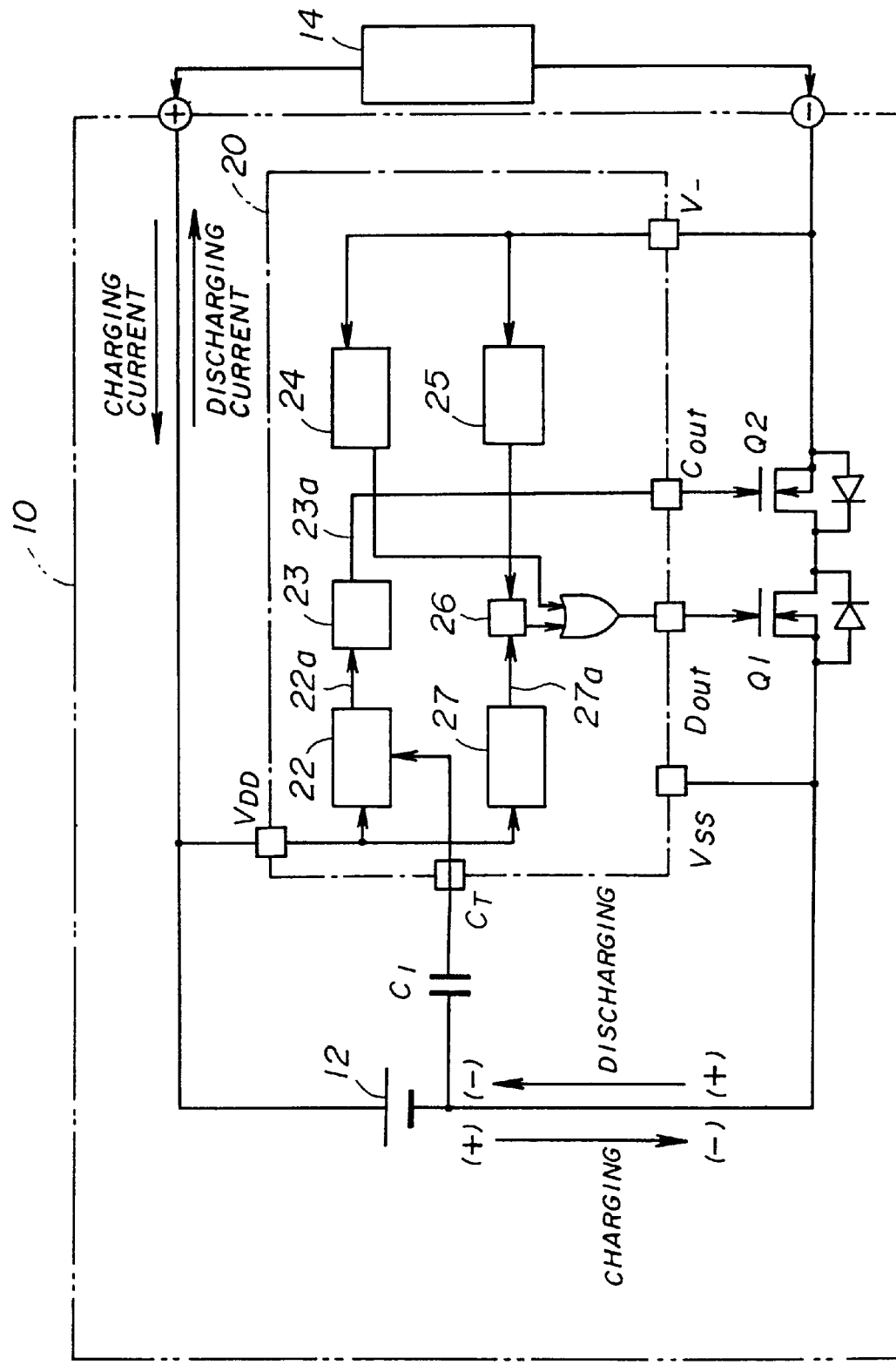
FIG. 3 is a functional block diagram of a battery pack in which a charge and discharge protection circuit according to the present invention is used.

FIG. 3 is a functional block diagram of a battery pack in which a charge and discharge protection circuit according to the present invention is used.

As shown in FIG. 3, a battery pack 10 according to the present invention comprises a secondary battery 12, a discharge FET switch Q1, a charge FET switch Q2, a capacitor C1 for setting a delay time when an overcharge current is detected and a charge and discharge protection circuit 20. While FIG. 3 shows a case where a charger 14 is connected to the battery pack 10, a load is provided in place of the charger 14 when the battery pack is normally operated. The construction of the charge and discharge protection circuit 20 will be described later.

When an improper charger is used in the battery pack 10, a portion of the battery pack 10 may be continually subject to a high voltage (for example, 28 V). For this reason, the charge and discharge protection circuit 20 should have a high withstand voltage. However, it is not necessary for all of the circuit elements to have a high withstand voltage. A description will now be given below of which circuit elements should have a high withstand voltage.

The charge and discharge protection circuit 20 has six terminals including a $V_{DD}$ terminal, a $V_{SS}$ terminal, a $C_T$ terminal, a $D_{OUT}$ terminal, a $C_{OUT}$ terminal and a V− terminal. The voltage between the $V_{DD}$ terminal and the $V_{SS}$ terminal is equal to the voltage of the secondary battery. The voltage between the $V_{DD}$ terminal and the V− terminal is equal to the voltage of the charger 14. When the charger 14 has a high voltage, the potential at the V− terminal becomes lower than the potential at the $V_{SS}$ terminal accordingly.

When the secondary battery 12 is implemented by a lithium ion battery, a determination of overcharge is given when a voltage greater than 4.25 V or 4.35 V is detected across the secondary battery 12. When the charge and discharge protection circuit 20 detects an overcharge state, the FET switch Q2 is turned off so that a charge current from the charger 14 is blocked. In this way, the voltage of the secondary battery 12 ($V_{DD}$−$V_{SS}$ voltage) is prevented from remaining a high level (for example, 28 V). Accordingly, a high voltage is prevented from being applied to the $V_{SS}$ terminal and the circuit elements connected thereto. The similar principle of protection applies to the terminal $C_T$. When an overdischarge state is detected, the FET switch Q1 is disconnected from the potential of the V− terminal by the FET switch Q2. Therefore, a high voltage is prevented from being applied to the $D_{OUT}$ terminal and the circuit elements connected thereto.

Assuming that the charger 14 with a supply voltage of 28 V is connected to the battery pack 10 and the FET switch Q2 is turned off, and assuming that the potential at the $D_{DD}$ terminal connected to the secondary battery 12 is a reference potential, only the voltage of the secondary battery 12 is applied to the $V_{SS}$ terminal, the $C_T$ terminal and the $D_{OUT}$ terminal. However, the 28 V voltage of the charger 14 is directly applied to the $C_{OUT}$ terminal and the V− terminal. More specifically, in order to avoid an overcharge state, the n-channel MOSFET switch Q2 must be turned off. This requires that the gate level (voltage at the $C_{OUT}$ terminal) be 0 with respect to the source level (voltage at the V− terminal). The $C_{OUT}$ terminal is connected to an output of a CMOS transistor (for example, transistors Q9 and Q10 shown in FIG. 6). In order for the output of the CMOS transistor to be sufficient to turn the FET switch Q2 off, the source of the CMOS transistor must be connected to the voltage at the V− terminal.

As described above, only those circuit elements connected to the $C_{OUT}$ terminal and the V− terminal should have a high withstand voltage construction. The remaining circuit elements in the battery pack 10 may have a low withstand voltage construction. FIG. 3 shows a short circuit detecting circuit 24 and an over-current detecting circuit 25 as being connected to the V− terminal. However, the circuit elements constituting the short circuit detecting circuit 24 and the over-current detecting circuit 25 import the voltage at the V− terminal as an input (gate input) to, for example, a comparator and do not import the V− voltage as a source level, unlike the CMOS transistor (for example, the transistors Q9 and Q10 shown in FIG. 6). Therefore, the circuit elements constituting the short circuit detecting circuit 24 and the over-current detecting circuit 25 need not have a high withstand voltage construction.

Figure 4:
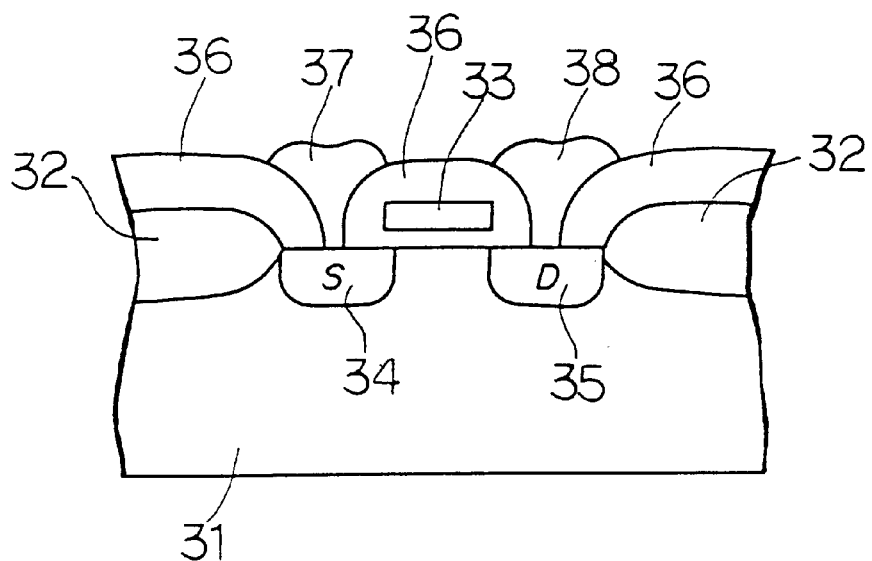
FIG. 4 shows a construction of a MOS transistor with a low withstand voltage using an ordinary LOCOS construction.

FIG. 4 shows an ordinary LOCOS construction of a MOS transistor with a low withstand voltage (12 V). An oxide 32 for isolation is made to grow on a substrate 31. A polysilicon gate 33, a source 34, a drain 35 and an intermediate insulating film 36 are formed on the substrate 31. Thereafter, an aluminum electrode 37 connected to the source 34 and an aluminum electrode 38 connected to the drain 35 are provided. The elements constituting the battery pack 10 shown in FIG. 3 other than those directly connected to the $C_{OUT}$ terminal and the V− terminal may have the low withstand voltage construction as shown in FIG. 4. More specifically, in the present invention, those circuit elements other than the ten transistors Q3–Q12 and three diodes shown in FIG. 6 (to be described later) have the low withstand voltage construction.

Figure 5:
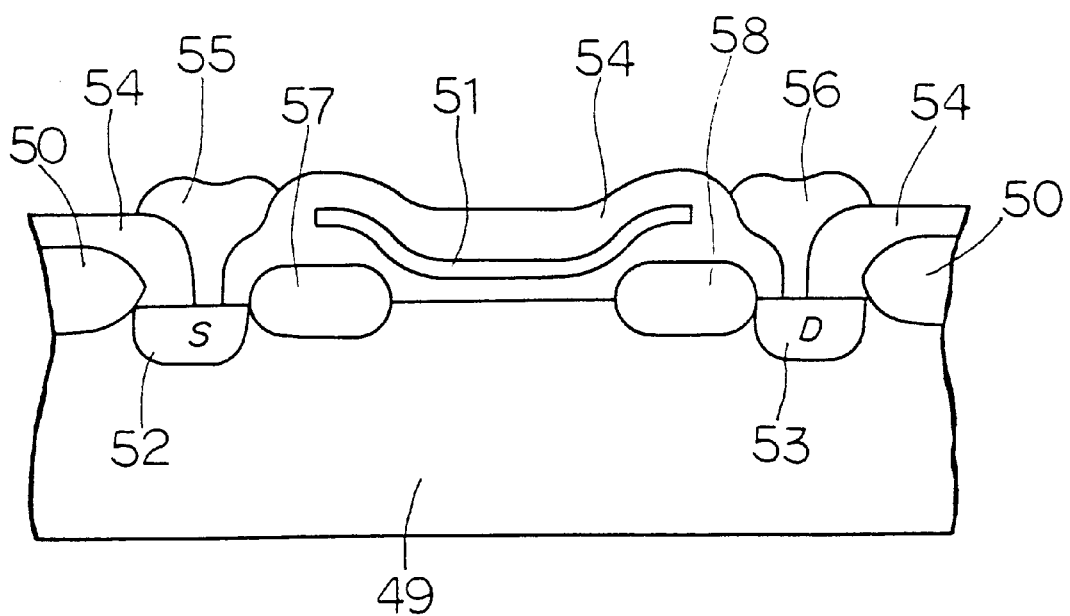
FIG. 5 shows a high withstand voltage construction for a MOS transistor.

FIG. 5 shows a high withstand voltage construction for a MOS transistor. An oxide 50 for isolation, an offset oxide 57 for increasing a source withstand voltage and an offset oxide 58 for increasing a drain withstand voltage are made to grow on a substrate 49. A polysilicon film 51 is formed to extend on the offset oxides 57 and 58. A source 52 and a drain 53 are also formed. Further, an intermediate film 54, an aluminum electrode 55 connected to the source 52 and an aluminum electrode 56 connected to the drain 53 are formed. Such a construction is called a LOCOS offset construction. Only those elements of the battery pack 10 of FIG. 3 that are directly connected to the $C_{OUT}$ terminal and the V– terminal are formed to have the high withstand voltage construction as shown in FIG. 5.

In an ordinary LOCOS offset construction, an offset film is provided only on the drain end. However, in the present invention, an offset film is provided on both the source end and the drain end, resulting in a double-sided LOCOS offset construction. The reason for providing the double-sided LOCOS offset construction is that the drain potential and the source potential may be interchanged due to a reverse connection of the charger or the like. In the present invention, only the ten transistors and the three diodes shown in FIG. 6 (to be described later) are formed to have the high withstand voltage construction shown in FIG. 5. Since the remaining circuit elements are formed to have a low withstand voltage construction, a charge and discharge protection circuit with a high withstand voltage and a reduced chip area results.

A detailed description will now be given, with reference to FIGS. 3 and 6, of the construction and operation of the charge and discharge protection circuit 20.

The charge and discharge protection circuit 20 has the capabilities of protecting the secondary battery 12 from an overcharge state, an overdischarge state and an over-current state. Referring to FIG. 3, the charge and discharge protection circuit 20 comprises an overcharge detecting circuit 22, a level shifting circuit 23 for shifting the $V_{SS}$ level to the V– level, an overdischarge detecting circuit 27, the over-current detecting circuit 25, a delay circuit 26 for setting a delay time used in detecting an overcharge state or an over-current state, and the short circuit detecting circuit 24, all formed on the same substrate. The operations of the overdischarge detecting circuit 27, the over-current detecting circuit 25, the delay circuit 26 and the short circuit detecting circuit 24 are the same as the corresponding conventional operations and the descriptions thereof are omitted.

Upon detecting an overcharge state of the secondary battery 12, the overcharge detecting circuit 22 supplies an overcharge detection signal 22a at a low level to the level shifting circuit 23. In accordance with the overcharge detection signal 22a from the overcharge detecting circuit 22, the level shifting circuit 23 supplies a charge control signal 23a to the $C_{OUT}$ terminal so as to turn the transistor (FET switch) Q2 off. Thus, overcharging of the secondary battery 12 is prevented.

Figure 6:
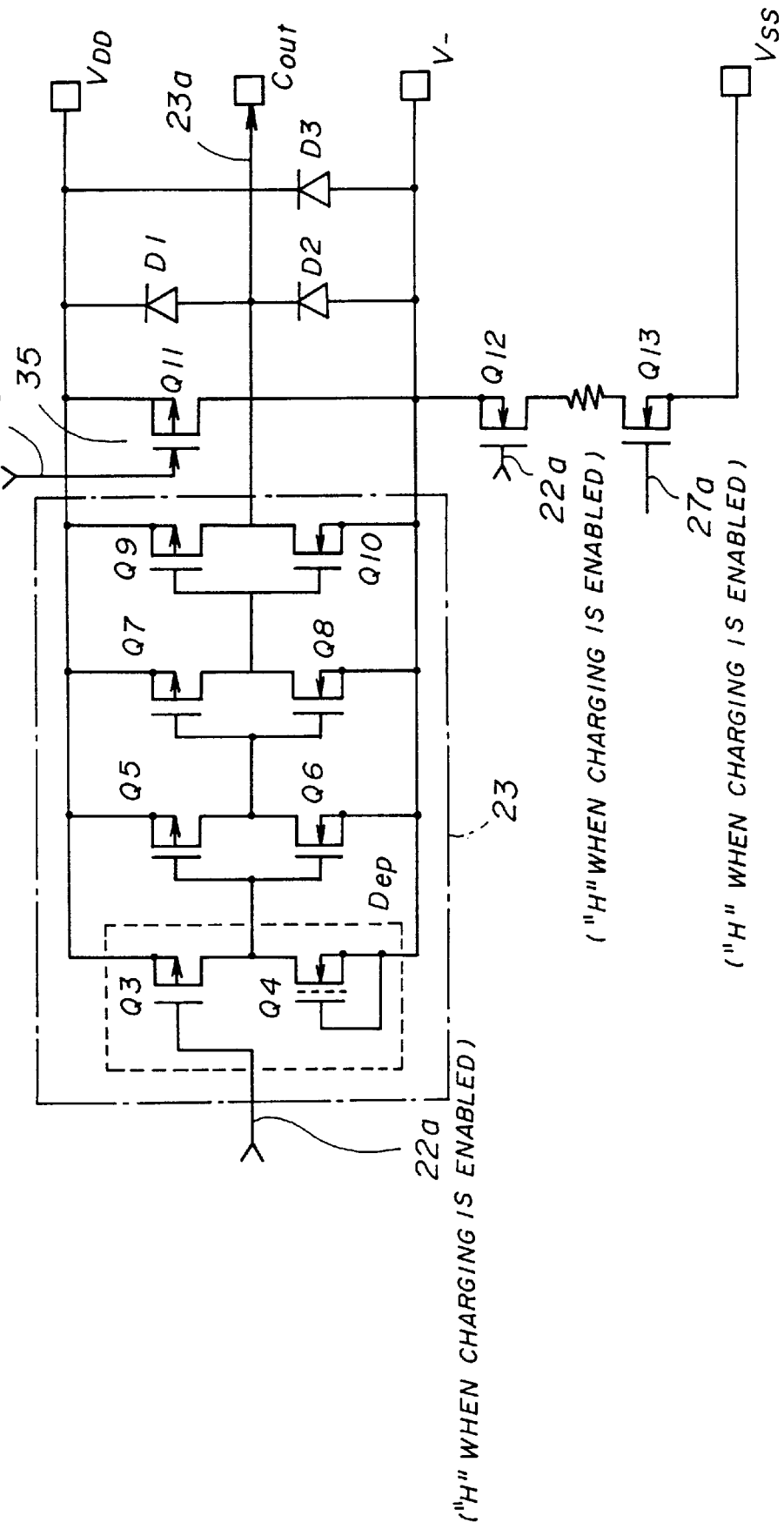
FIG. 6 is a circuit diagram showing a part of a charge and discharge protection circuit relevant to the present invention.

FIG. 6 is a circuit diagram showing a part of the charge and discharge protection circuit 20 relevant to the present invention. More specficially, FIG. 6 mainly shows the level shifting circuit 23 that includes MOS transistors with a high withstand voltage. The level shifting circuit 23 is constructed such that an enhancement p-channel transistor Q3 connected to the $V_{DD}$ terminal is connected in series with a depletion n-channel transistor Q4 connected to the V– terminal, having the gate and source thereof connected to each other and operating as a constant current source, a predetermined number of inverters embodied by transistor pairs (Q5, Q6), (Q7, Q8), (Q9, Q10) in cascade connection succeeding the series circuit.

A p-channel transistor Q11, an n-channel transistor Q12 and an n-channel transistor Q13 are provided to succeed the level shifting circuit 23. An overdischarge detection signal 27a from the overdischarge detecting circuit 27 is input to the gate of the transistor Q11. When the overdischarge detection signal 27a is at a low level, indicating that discharge from the secondary battery 12 is disabled, the transistor Q11 is turned on, thus causing the potential at the V– terminal to be pulled up to the potential at the $V_{DD}$. In this way, an unstable circuit operation is prevented even when an overdischarge state is created, stopping a current supply to the load, and when the $V_{DD}$ terminal and the V– terminal become open.

Similarly, the overcharge detection signal 22a is input to the gate of the transistor Q12 and the overdischarge detection signal 27a is input to the gate of the transistor Q13. When the overcharge detection signal 22a is at a high level, indicating that charging of the secondary battery 12 is enabled (that is, when an overcharge state is not created), the transistor Q12 is turned on. The transistor Q13 is turned on when an overdischarge state is not created. Thus, the transistors Q12 and Q13 are turned on when neither an overcharge state nor an overdischarge state is created. In this state, the potential at the V– terminal is pulled down to the $V_{SS}$ level. That is, the transistors Q12 and Q13 operate as pull-down resistors for pulling down the V– level to the $V_{SS}$ level when an over-current state is detected, that is, when the positive terminal and the negative terminal of the battery pack are short-circuited and then become open. The transistor Q13 need not have a high withstand voltage construction because, when an overcharge state is created, transistor Q12 is turned off so that a high voltage is not applied to the transistor Q13.

A description will now be given of generation of the charge control signal 23a.

When the overcharge detection signal 22a is at a high level, indicating that a charging operation is enabled, the transistor Q3 is turned off and the transistor Q4 operates as a constant current source. Therefore, the drain voltage of the transistors Q3 and Q4 is at an "L" level (V– level) which is input to the inverter composed of the transistors Q5 and Q6. Since the transistor Q5 is turned on and the transistor Q6 is turned off, the drain voltage of the transistors Q5 and Q6 is at a "H" level ($V_{DD}$ level) which is input to the inverter composed of the transistors Q7 and Q8. Since the transistor Q7 is turned off and the transistor Q8 is turned on, the drain voltage of the transistors Q7 and Q8 is at a "L" level which is input to the inverter composed of the transistors Q9 and Q10. Since the transistor Q9 is turned on and the transistor Q10 is turned off, the drain voltage of the transistors Q9 and Q10, that is, the voltage at the $C_{OUT}$ is at a "H" level. That is, the charge control current 23a is at a "H" level. As a result, the FET switch Q2 is turned on so that the secondary battery 12 is charged.

When the overcharge detection signal 22a is at a low level, indicating that a charging operation is disabled, the level shifting circuit 23 operates in a manner contrary to the above such that the voltage at the V– terminal ("L" level) is applied to the $C_{OUT}$ terminal and the FET switch Q2 is turned off as a result, thus preventing the secondary battery 12 from being charged.

As is obvious from the circuit diagram of FIG. 6, the V– voltage is applied to the source or the drain of the transistors Q3–Q12. Therefore, it is necessary for the transistors Q3–Q12 to have a high withstand voltage construction. By forming the transistors Q3–Q12 to have a high withstand voltage construction, the battery pack 10 has a high withstand voltage construction as a result.

Diodes D1, D2 and D3 are provided for protection from static electricity and desirably have a high withstand voltage.

The present invention is not limited to the above-described embodiments, and variations and modifications may be made without departing from the scope of the present invention.

This application is based on Japanese Application Nos. 9-151314 filed Jun. 9, 1997 and 9-204265 filed Jul. 30, 1997, both of which are incorporated herein by reference.

What is claimed is:

1. A charge and discharge protection circuit coupled to one of a secondary battery and a charger, for protecting the secondary battery from an overcharge state, an overdischarge state and an over-current state, comprising:

an overcharge detecting circuit for monitoring how the secondary battery is charged and for generating an overcharge detection signal;

a level shifting circuit for receiving the overcharge detection signal from the overcharge detecting circuit and for generating a charge control signal;

an overdischarge detecting circuit for monitoring how the secondary battery discharges itself and for generating an overdischarge detection signal;

an over-current detecting circuit for detecting an over-current state of the secondary battery and for generating an over-current detection signal;

a delay circuit for setting a delay time used when one of an overdischarge state and an over-current state is detected;

a short circuit detecting circuit for detecting a short circuit state and for generating a short circuit detection signal;

a plurality of protection diodes for protection of the overcharge and overdischarge protection circuit from static electricity, and wherein transistors constituting the level shifting circuit that potentially receive a relatively high voltage from the charger as one of a source level and a drain level have a high withstand voltage construction.

2. The charge and discharge protection circuit as claimed in claim 1, wherein said protection diodes have a high withstand voltage construction.

3. The charge and discharge protection circuit as claimed in claim 1, further comprising a pull-up resistor embodied by a pull-up transistor for preventing said charge and discharge protection circuit from becoming unstable when an overdischarge state is created, stopping a current supply to a load, and when terminals connected to the charger become open, and wherein said pull-up transistor has a high withstand voltage construction.

4. The charge and discharge protection circuit as claimed in claim 1, further comprising a pull-down resistor embodied by a plurality of pull-down transistors for preventing said charge and discharge protection circuit from becoming unstable when terminals connected to the charger are short-circuited and then become open, wherein those of said plurality of pull-down transistors that potentially receive a relatively high voltage as one of a source level and a drain level have a high withstand voltage construction.

5. The charge and discharge protection circuit as claimed in claim 1, wherein said transistors have a LOCOS offset construction provided with an isolation film, a first offset oxide for ensuring that a source has a high withstand voltage, a second offset oxide for ensuring that a drain has a high withstand voltage, and a polysilicon gate formed to cover said offset oxides.

6. The charge and discharge protection circuit as claimed in claim 3, wherein said pull-down transistor has a LOCOS offset construction provided with an isolation film, a first offset oxide for ensuring that a source has a high withstand voltage, a second offset oxide for ensuring that a drain has a high withstand voltage, and a polysilicon gate formed to cover said offset oxides.

7. The charge and discharge protection circuit as claimed in claim 4, wherein said high withstand voltage construction is a LOCOS offset construction provided with an isolation films, a first offset oxide for ensuring that a source has a high withstand voltage, a second offset oxide for ensuring that a drain has a high withstand voltage, and a polysilicon gate formed to cover said offset oxides.

8. A battery pack comprising:

a battery cell;

two terminals connected to one of a charger and a load;

a charge and discharge protection circuit connected to said battery cell so as to protect said battery cell from an overcharge state, an overdischarge state and an over-current state;

a discharge transistor connected in series between the load and said battery cell so as to control a discharge current supplied from said battery cell to the load;

a charge transistor connected in series between the charger and said battery cell so as to control a charge current from the charger to said battery cell;

a capacitor for setting a delay time used in detecting the overcharge state;

wherein said charge and discharge protection circuit comprises:

an overcharge detecting circuit for monitoring how the battery cell is charged and for generating an overcharge detection signal;

a level shifting circuit for receiving the overcharge detection signal from the overcharge detecting circuit and for generating a charge control signal;

an overdischarge detecting circuit for monitoring how the battery cell discharges itself and for generating an overdischarge detection signal;

an over-current detecting circuit for detecting an over-current state of the battery cell and for generating an over-current detection signal;

a delay circuit for setting a delay time used when one of an overdischarge state and an over-current state is detected;

a short circuit detecting circuit for detecting a short circuit state and for generating a short circuit detection signal;

a plurality of protection diodes for protection of the overcharge and overdischarge protection circuit from static electricity, and wherein transistors constituting the level shifting circuit that potentially receive a relatively high voltage from the charger as one of a source level and a drain level have a high withstand voltage construction.

* * * * *